United States Patent
Shinozaki et al.

(10) Patent No.: US 6,827,879 B2
(45) Date of Patent: Dec. 7, 2004

(54) ACTIVATED CARBON MATERIAL, PROCESS FOR PRODUCING THE SAME AND ELECTRIC DOUBLE LAYER CAPACITOR EMPLOYING THE SAME

(75) Inventors: Yasuo Shinozaki, Kanagawa (JP); Kazuya Hiratsuka, Kanagawa (JP); Toshiharu Nonaka, Tokyo (JP); Kazuyuki Murakami, Tokyo (JP)

(73) Assignee: JFE Chemical Corporation, Tokyo (JP)

( * ) Notice: Subject to any disclaimer, the term of this patent is extended or adjusted under 35 U.S.C. 154(b) by 8 days.

(21) Appl. No.: 10/330,094

(22) Filed: Dec. 30, 2002

(65) Prior Publication Data

US 2003/0158342 A1 Aug. 21, 2003

Related U.S. Application Data

(62) Division of application No. 09/891,292, filed on Jun. 27, 2001, now Pat. No. 6,547,990.

(30) Foreign Application Priority Data

Jun. 27, 2000 (JP) ........................................ 2000-192393

(51) Int. Cl.⁷ ............................ H01B 1/04; H01G 4/00
(52) U.S. Cl. ...................................... 252/502; 361/305
(58) Field of Search ........................ 252/502; 502/418; 423/448, 460; 361/302, 305, 508; 438/236

(56) References Cited

U.S. PATENT DOCUMENTS 6,118,650 A * 9/2000 Maeda et al. ............... 361/508
6,585,915 B2   7/2003 Shinozaki et al.

FOREIGN PATENT DOCUMENTS

EP          0 984 471        3/2000

OTHER PUBLICATIONS

U.S. patent application Ser. No. 09/559,073, Murakami et al., filed Apr. 27, 2000.
U.S. patent application Ser. No. 09/961,289, Ishikawa et al., filed Sep. 25, 2001.

* cited by examiner

*Primary Examiner*—Mark Kopec
(74) *Attorney, Agent, or Firm*—Oblon, Spivak, McClelland, Maier & Neustadt, P.C.

(57) ABSTRACT

A carbonaceous material which has a total pore volume of from 0.3 to 2.0 cm³/g per unit mass, a volume of micropores having diameters of from 10 to 20 Å of from 10 to 60% based on the total pore volume, a volume of mesopores having diameters of from 20 to 200 Å of from 20 to 70% based on the total pore volume, a volume of macropores having diameters exceeding 200 Å of not more than 20% based on the total pore volume, and a specific surface area of from 1,000 to 2,500 m²/g.

6 Claims, No Drawings

US 6,827,879 B2

ACTIVATED CARBON MATERIAL, PROCESS FOR PRODUCING THE SAME AND ELECTRIC DOUBLE LAYER CAPACITOR EMPLOYING THE SAME

BACKGROUND OF THE INVENTION

1. Field of the Invention

The present invention relates to an activated carbon useful for an electrode as, for example, an electric double layer capacitor, a process for producing the activated carbon and an electric double layer capacitor employing the activated carbon. The electric double layer capacitor of the present invention can be widely used for power sources for various portable apparatus, standby power sources for domestic electrical equipment, UPS for optical communication, power sources for electric automobiles and the like.

2. Discussion of Background

As an electric double layer capacitor, a coin type obtained in such a manner that an element having a pair of electrodes consisting mainly of an activated carbon formed on a current collector and a separator sandwiched therebetween, together with an electrolytic solution, is sealed in a metal casing by means of a metal lid and a gasket insulating the casing from the lid, and a wound type obtained in such a manner that a pair of sheet electrodes is wound by means of a separator interposed therebetween to obtain a wound element, which is accommodated in a metal casing together with an electrolytic solution, and sealed in the casing so that the electrolytic solution does not evaporate from an opening of the casing, have been known.

Further, for an application which requires a large current and large capacitance, stack type electric double layer capacitor having an element obtained by stacking a large number of sheet electrodes by means of a separator interposed therebetween, incorporated therein, has been proposed (JP-A-4-154106, JP-A-3-203311, JP-A-4-286108). Namely, a plurality of sheet electrodes formed into a rectangle as positive electrodes and negative electrodes are alternately stacked one on another by means of a separator interposed therebetween to obtain a stacked element, a positive electrode lead material and a negative electrode lead material are connected with the respective terminals of the positive electrodes and the negative electrodes by caulking, and the element in such a state is accommodated in a casing, impregnated with an electrolytic solution and sealed with a lid.

Heretofore, as an electrolytic solution for an electric double layer capacitor, a solvent having a high dielectric constant such as water or propylene carbonate has been used so as to dissolve an electrolyte at a high concentration. As an electrode for an electric double layer capacitor, wherein the charge of an electric double layer formed on the surface of the activated carbon itself contributes to the capacitance of the electric double layer capacitor, made mainly of an activated carbon having a large specific surface area has been employed.

An activated carbon is produced usually by carbonizing and activating a carbon source derived from a plant such as a sawdust or a coconut shell, a carbon source derived from a coal/petroleum material such as a coke or a pitch, or a synthetic high polymer carbon source such as a phenol resin, a furfuryl alcohol resin or a vinyl chloride resin.

The carbonization means a sequence of processes, in which an organic carbon material as the above carbon source is heated and changed so that the carbon is concentrated through a bond-cleavage, a decomposition and a polycondensation to be converted to a solid carbon product (a carbonized product). The carbonization is carried out usually by heating a carbon source in a non-oxidizing atmosphere at a temperature of from 300° C. to 2,000° C.

The activation is a process in which a precise porous structure is formed in the carbonized product obtained above. Usually, the activation is carried out by a gas activation process in which the carbonized product is heated in a weak oxidizing gas containing carbon dioxide or water vapor at a temperature of from 500° C. to 1,100° C., so that the carbonized product is oxidized and exhausted to have a porous structure and to increase its surface area. Otherwise, the activation is carried cut by a chemical activation process (an alkali activation process) in which the carbonized product is mixed with an alkali metal hydroxide (such as KOH) in an amount of equal to or several times the mass of the carbonized product, and then the mixture is heated at a temperature of from the melting point of the metal hydroxide to 1,000° C., preferably from 400 to 800° C. in an inert atmosphere for from several tens minutes to 5 hours so that the carbonized product can have a porous structure and increase its surface area. The alkali metal hydroxide is removed by adequate washing after the activation process is finished.

As important properties required for an electric double layer capacitor, a) large capacitance, b) a high energy density, c) high durability when charging and discharging cycles are repeated, and d) a low internal resistance, may, for example, be mentioned.

As an electrode material presenting large capacitance among the properties, an activated carbon obtained by activating a carbon material derived from a pitch by heating in the coexistence of an alkali metal hydroxide (an alkali activation) has been proposed (JP-A-5-258996, JP-A-10-199767, U.S. Pat. No. 3,817,874, U.S. Pat. No. 4,082,694).

Further, it is reported that an activated carbon obtained by alkali activation of a carbon material having a relatively developed graphitizability, such as a pitch showing optical anisotropy i.e. so-called mesophase pitch as a carbon source, has large capacitance per mass, and has a relatively high bulk density. Accordingly, when the activated carbon is formed into an electrode, the electrode has a high density, whereby an electric double layer capacitor having the electrode has large capacitance per unit volume (JP-A-2-185008, JP-A-10-121336).

However, according to the studies of the present inventors, the electrode containing an activated carbon derived from the material of which the graphitizability is relatively developed has problems: the electrode incorporated into a capacitor cell case tends to expand remarkably at the process of charging, resulting in the failure of the cell case, moreover due to the expansion of the electrode the capacitance per volume of the electrode after expansion is not large enough comparing to that calculated from the volume of the electrode before expansion.

On the other hand, in an electric double layer capacitor, it is also known to use an electrode containing an activated carbon which has a large specific surface area, obtained by steam activation or alkali activation of a carbon source constituted by a carbon material having a relatively low graphitizability, such as a thermosetting resin for example a phenol resin or a pitch showing optical isotropy. This type of the capacitor has a large capacitance per unit mass, a low expansion of the electrode at the time of charging and a high durability when charging and discharging are repeated for a long period of time. However, this type of the capacitor has a problem that the capacitance per unit volume tends to be small because a bulk density of the activated carbon is low.

Although it has not been fully explained why an activated carbon electrode obtained by alkali activation of a carbon material having a relatively developed graphitizability expands during charging, the present inventors consider its reason as follows: In general, it tends to be difficult to increase the specific surface area of a carbon material having a developed graphitizability by gas activation. Accordingly, an alkali activation is employed to increase the specific surface area of the carbon material. The mechanism of the activation by an alkali metal hydroxide is not clearly understood in detail for the most part. However, for example using the example of an activation by KOH, KOH infiltrates into between carbon layers at a relatively low temperature of from 400 to 500° C., during this step, carbonation of carbon and gasification of carbon with generated water or carbonic dioxide gas are caused, whereby carbon is consumed to increase the specific surface area, and a potassium metal generated by reduction of KOH is intercalated as a guest into between carbon layers (a host) (New Edition Activated Carbon, Yuzo Sanada, Kodansha Ltd. Publishers, Scientific).

It is estimated that in an activated carbon subjected to alkali activation has weak bonding force between carbon layers caused by the intercalation mentioned above. Accordingly, it is considered that when the activated carbon is used as an electrode for an electric double layer capacitor, not only ions are adsorbed into pores in the activated carbon but some ions are adsorbed into pores to widen the space between carbon layers at the time of charging.

SUMMARY OF THE INVENTION

It is an object of the present invention to overcome the above problems of prior art and to provide an activated carbon having large capacitance per unit volume when it is used as an electrode for an electric double layer capacitor, and a process for producing the same. Further, the present invention is to provide an electric double layer capacitor having large capacitance and high reliability wherein the expansion of an electrode is suppressed using the activated carbon as an electrode material.

As a result of carrying out extensive studies to solve the above problem of the conventional activated carbon, the present inventors have found the following facts: By mixing a carbon source to form high graphitizability carbon and a carbon source to form high non-graphitizability carbon, and, followed by subjecting the resulting mixture to a carbonization and an activation treatment can be obtained an activated carbon. Thus obtained activated carbon has an advantage of large capacitance per unit volume caused from large capacitance and a large bulk density of the activated carbon derived from a high graphitizability carbon component, and also an advantage of large capacitance per unit mass, a low deterioration in the performance after the repeating of charging and discharging cycle, and a low expansion of an activated carbon particle by ion absorption caused from an activated carbon derived from a high non-graphitizability carbon component. At the same time the above activated carbon further has property of complement to the weaknesses of the activated carbon derived from the other respective carbon-sources.

According to the present invention, there is provided an activated carbon for an electric double layer capacitor electrode, which comprises a stacking structure having 2 layers or less in a proportion of from 25 to 80% and a stacking structure having 5 layers or more in a proportion of from 2 to 30% in the distribution of a stacking structure as obtained by analysis of the X-ray diffraction pattern of (002) plane, and which has a specific surface area of from 500 to 2,800 m$^2$/g and a total pore volume of from 0.5 to 1.8 cm$^3$/g.

According to the present invention, there is provided a process for producing an activated carbon for an electric double layer capacitor electrode, which comprises: (1) a step of mixing a carbon source which forms a non-graphitizable carbon by heating (hereinafter also referred to as a non-graphitizable carbon) and a carbon source which forms a graphitizable carbon by heating (hereinafter also referred to as a graphitizable carbon); (2) a step of carbonizing the resulting mixture by means of heating; and (3) a step of activating the carbonized product.

Further, according to the present invention, there is provided an electric double layer capacitor comprising an electrode containing the activated carbon described above.

DETAILED DESCRIPTION OF THE PREFERRED EMBODIMENTS

The fundamental feature of the activated carbon according to the present invention is that the carbon forming the skeleton of the activated carbon comprises a high graphitizability carbon component and a high non-graphitizability carbon component, both of which are homogeneously mixed.

Herein, the high graphitizability carbon component has a stacking structure with a relatively high regularity of six-membered ring condensed layers so called "turbostratic structure", wherein layered surfaces are firstly superimposed in a parallel and equal distance similar to a graphite, and secondary, are not completely oriented and overlapped irregularly, although that is not a single complete crystal structure of a graphite.

On the other hand, the high non-graphitizability carbon component comprises space lattice wherein carbon six-membered rings are inter-connected irregularly, and has almost no stacking of six-membered ring condensed layers called amorphous carbon or a lamination of six-membered ring condensed layers having structure poor in the regularity.

These different structures can be identified qualitatively by diffraction peaks from (002) of carbon in a wide-angle X-ray diffraction as follows: the diffraction peaks of a high graphitizability part are relatively sharp, and the diffraction peaks of a high non-graphitizability part are wide. When carbon having different structure is homogeneously mixed, the overlapped diffraction peaks derived from the above diffraction peaks are observed to mean coexistence of both structures. More quantitatively, it can be made by analyzing diffraction peaks from (002) of carbon in a wide-angle X-ray diffraction in the following method (Nemoto et al. "Research Report of a Faculty of Hokkaido University, volume 91, (1978)).

Namely, the diffraction intensity $I_{002}$ of (002) band of carbon by X-ray diffraction is corrected by an atomic scattering factor f and transformed by the Fourier transform to obtain a patterson function P(u) represented by the formula (1):

$$P(u) = 2\int_0^n (I_{002}/f^2)\cos 2\pi suds \quad (1)$$

(in the formula, $I_{002}$ represents strength of (002) band, f represents an atomic scattering factor, s represents a distance of reciprocal lattice and u represents a distance of real space.)

This patterson function P(u) represents the number of the carbon layer surface which is recognized at a vertical distance from the certain carbon layer surface. The ratio of the stacking structure containing N layers in all of stacking layers can be obtained from the peak area which P(u) accounts for on the background. Thus, in the above analysis, a large high stacking structure ratio represents high carbon graphitizability, and a large low stacking structure ratio represents relatively high carbon non-graphitizability.

As a result of the studies by the inventors of the present invention from the above viewpoint, the following facts have been found: a high stacking structure of from 5 layers to 6 layers is observed in a carbonized product powder derived from e.g. a petroleum pitch which is a graphitizable carbon source. On the other hand, a stacking structure of 3 layers or more does not exists in a carbonized product powder derived from a phenol resin such as a novolac resin which is a non-graphitizable carbon source. Thus, it preferred that a stacking structure of 5 layers or more is used for a measure of high graphitizability carbon, and a stacking structure of 2 layers or less is used for a measure of non-graphitizability carbon.

Table 1 shows one example of the results obtained by calculating the amount of the stacking structure containing the layer surface of N layer as obtained by analyzing, according to the method mentioned above, the diffraction peak of (002) plane of the carbonized product, which was provided by carbonizing of the mixture of a phenol resin and a coal tar pitch at 700° C. as raw material, herein the mixing ratio was determined by considering a carbonization yield of each raw materials.

TABLE 1

| Carbon derived from Resin % | 2 Layer | 3 Layer | 4 Layer | 5 Layer | 6 Layer |
|---|---|---|---|---|---|
| 0 | 0.19 | 0.28 | 0.25 | 0.15 | 0.12 |
| 10 | 0.25 | 0.25 | 0.23 | 0.14 | 0.11 |
| 20 | 0.32 | 0.22 | 0.20 | 0.12 | 0.09 |
| 30 | 0.39 | 0.20 | 0.18 | 0.11 | 0.08 |
| 40 | 0.46 | 0.17 | 0.15 | 0.09 | 0.07 |
| 50 | 0.52 | 0.14 | 0.13 | 0.08 | 0.06 |
| 60 | 0.59 | 0.11 | 0.10 | 0.06 | 0.05 |
| 70 | 0.66 | 0.08 | 0.08 | 0.05 | 0.04 |
| 80 | 0.73 | 0.06 | 0.05 | 0.03 | 0.02 |
| 90 | 0.79 | 0.03 | 0.03 | 0.02 | 0.01 |
| 100 | 0.86 | 0.00 | 0.00 | 0.00 | 0.00 |

From the summarized results of the above studies, the activated carbon of the present invention comprises a stacking structure having 2 layers or less in a proportion of from 25 to 80%, preferably from 30 to 75%, particularly preferably from 40 to 65%, and a stacking structure having 5 layers or more in a proportion at from 2 to 30%, preferably from 5 to 25%, particularly preferably from 10 to 20%, in the distribution of stacking structures containing layer surface of N layer as obtained from the analysis of the X-ray diffraction pattern of (002) band.

The activated carbon of the present invention comprises a homogeneously mixed structure of a high graphitizability carbon part and a high non-graphitizability carbon part, wherein the above carbon parts having different graphitizability exist presumably in the completely and strongly interconnected state in a particle of the activated carbon.

The reason why excellent properties can be attained in the case of using the activated carbon having the above-mentioned structure as an electrode material for an electric double layer capacitor, is estimated that the skeleton of the high non-graphitizability carbon restrict the skeleton of the high graphitizability carbon, which will be explained in the following.

The activated carbon made from high non-graphitizability carbon has a low bulk density because of the low graphitizability of carbon and the disordered structure, whereby it is difficult to fill many electrodes made of an activated carbon into unit volume. As a result, sufficiently high capacitance per unit volume, which is important characteristics for an electric double layer capacitor cannot be obtained. However, the activated carbon made from high non-graphitizability carbon has high capacitance per unit mass because a high specific surface area is easily obtained by activation. The activated carbon made from high non-graphitizability carbon further has skeleton structure made of space lattice containing an irregular inter connection of six-membered ring, that is, the skeleton structure of the activated carbon has large strength, whereby low changes in the volume of the activated carbon particle at the adsorption-desorption of ions can be attained.

On the other hand, the activated carbon made from high graphitizability carbon has relatively high capacitance per unit mass and a high bulk density from its structural reason, whereby it is possible to fill many activated carbon electrodes into unit volume. As a result, sufficiently apparent high capacitance per unit volume, which is important characteristics for an electric double layer capacitor can be obtained. However, as already mentioned, the activated carbon particle (electrode) made from high graphitizability carbon has high volume expansion at the time of charging, whereby capacitance per unit volume correctly calculated from the volume after electrode expansion is not sufficiently high. Particularly, there is a problem that the destruction of the outer casing of the capacitor caused by the expansion of the electrode is likely to occur since the electrode is heavily expanded at the time of charging.

The activated carbon of the present invention has a homogeneously mixed structure of a high graphitizability part and a high non-graphitizability part, wherein a stacking structure having 2 layers or less is at least from 25 to 80% and a stacking structure having 5 layers or more is at least from 2 to 30% in the distribution of stacking structures containing layer surface of N layer as obtained by the analysis of the X-ray diffraction pattern of (002) band. Accordingly, the skeleton of a high non-graphitizability activated carbon having small volume change at the time of charging and discharging caused by large structural strength restricts the skeleton of a high graphitizability activated carbon and suppress the volume expansion of a high graphitizability activated carbon which has apparent high capacitance per unit volume but large volume expansion after charging. Consequently, as the advantages of both activated carbon are combined, it is possible to form activated carbon material for an electric double layer capacitor electrode having large capacitance per unit volume and excellent long reliability as well as restricted volume change of the activated carbon particles at the time of charging and discharging.

When the proportion of the stacking structure having 2 layers or less is less than 25%, the effect of restricting the volume expansion at the time of charging will be low. When such a proportion exceeds 80%, the capacitance will not become high enough because of too much high non-graphitizability carbon part. On the other hand, when the proportion of the stacking structure having 5 layers or more is less than 2%, the same problem caused by too much non-graphitizability carbon part will occur. When such a proportion exceeds 30%, the volume expansion at the time of charging will become large because of too much high graphitizability carbon part.

In addition to the above structure, the activated carbon of the present invention for the electrode has a specific surface area of from 500 to 2,800 $m^2/g$, preferably from 1,300 to 2,500 $m^2/g$ and a total pore volume of from 0.5 to 1.8 $cm^3/g$, preferably from 0.7 to 1.5 $cm^3/g$. When these values are less than the above range, sufficient capacitance will not be obtained. When these values are larger the above range, the activated carbon will become bulky, whereby the capacitance per unit volume of the electrode will be deteriorated.

The excellent characteristics of the activated carbon of the present invention can be attained by the homogeneous mixture of a high graphitizability structure part and a high non-graphitizability structure part and by strong connection between them, while the skeleton structure of the activated carbon is restricted. As shown from Examples and comparative Examples later described, the excellent properties obtained by the activated carbon of the present invention cannot be attained, when activated carbon particles solely made of a high graphitizability structure part and activated carbon particles solely made of a high non-graphitizability structure part are simply mixed.

The activated carbon of the present invention comprising a high graphitizability part and a high non-graphitizability part is obtained by the following process: (1) a step of homogeneously mixing a carbon source which forms a non-graphitizable carbon by heating and a carbon source which forms a graphitizable carbon by heating; (2) a step of carbonizing the resulting mixture by means of heating; and (3) a step of activating the resulting carbonized product.

An non-graphitizable carbon (hard carbon) means carbon which is not easily converted to graphite by a graphitizing treatment. As already mentioned, this carbon has a structure in which six-membered rings are irregularly interconnected so that the layer surfaces is not likely to connect with each other without large atom migration, and its crystallization will not easily proceed.

As a carbon source to form such non-graphitizable carbon, can be used generally a thermosetting resin such as a phenol resin, a melamine resin, a urea resin, a furan resin, an epoxy resin, an alkyd resin, an unsaturated polyester resin, a diallylphthalate resin, a furfural resin, a silicone resin, a xylene resin, an urethane resin, etc. A phenol resin is preferred from the points of easy handling at the production, high yield of carbonization, large solubility to a solvent, large mutual solubility with graphitizable carbon described later, etc.

When a phenol resin is employed as a thermosetting resin, a resol type phenol resin and/or a novolac type phenol resin may be preferably used.

A graphitizable carbon (soft carbon) means a carbon which can be converted to graphite by a graphitizing treatment. The crystallite of this carbon has a disordered structure similar to graphite, wherein the layer surfaces are superimposed in parallel and equal distance and ranged in the same direction so that the layer surfaces will disappear with small atom migration to become graphite.

As a graphitizable carbon source which forms such a graphitizable carbon by heating at a high temperature, a common thermoplastic resin such as a vinyl chloride type resin, polyacrylonitrile, polybutyral, polyacetal, polyethylene, polycarbonate or a polyvinyl acetate may, for example, be mentioned. A pitch type material such as a petroleum type pitch or a coal type pitch or coke obtained by subjecting those types of pitch to a heat treatment may also be mentioned. A condensed polycyclic type hydrocarbon compound such as naphthalene, phenanthrene, anthracene, triphenyrene and pyrene may also be employed. A fused heterocycle type compound such as indole, quinoline, carbazole and acridine may also be employed. Among them, a pitch type material is preferably used from the points of low cost, a high yield of carbonization, its easy conversion to a liquid state by heating, large solubility to a solvent, etc.

(1) First, in the step of mixing, a carbon source which forms a non-graphitizable carbon by heating and a carbon source which forms a graphitizable carbon by heating are mixed homogeneously.

The mixing ratio of the carbon source which forms non-graphitizable carbon by heating/the carbon source which forms graphitizable carbon by heating is preferably within the range of from 9.5/0.5 to 1/9 in the mass ratio at the time of mixing of the respective carbon sources, although the mixing ratio varies depending on the residual amount of the carbon after carbonization of the respective carbon sources.

In general, the carbon source which forms non-graphitizable carbon by heating and the carbon source which forms graphitizable carbon by heating may be homogeneously mixed in the powdered form of respective carbon sources. Further, in order to enhance the homogeneousness of mixing, it is preferred that at least one of the carbon sources in a liquid state and the other carbon source in the form of fine powder are mixed in a solid-liquid type mixing. More preferably, both carbon sources are mixed in their liquid state for homogeneous mixing.

When the carbon sources are mixed in their powdered form, the powders of the carbon sources preferably have a particle diameter of 100 $\mu m$ or less, more preferably from 0.5 to 20 $\mu m$, because the finer carbon particle of the carbon sources, the more homogeneous mixing is expected since the particles to be mixed can be close to each other. As a mixer, a usual mixer for solid material such as a V type mixer, a horizontal cylindrical type mixer, a ribbon type mixer, a vertical screw type mixer, a Mueller type mixer, a reverse rotation Mueller type mixer, etc. may be employed.

In order to obtain the fine powders having a particle diameter mentioned above, the following grinding machine may be appropriately employed depending on the properties of the original carbon sources and the objective particle diameter of the fine powder: a jaw crusher, a jairetry crusher, a single roll crusher, a cone crusher, a dodge crusher, a double-roll crusher, an edge runner, a hammer mill, a rotary crusher, an impeller breaker, a ball mill, a conical mill, a tube mill, a rod mill, an attrition mill, a hammer mill, a jet mill, or a micron mill.

When it is difficult to obtain the fine powders having the above particle diameter beforehand, the respective carbon sources which have been roughly crushed into around several millimeters may be mixed while they are ground using a dry-type ball mill, a wet-type ball mill, an edge runner, a colloidal mill, etc.

The powders homogeneously mixed on the order of micrometer as described above are decomposed and poly-condensated to concentrate the carbon in the step of carbonization, while each mixed state is maintained. Thus, it is considered that the respective parts derived from the carbon sources (a high graphitizability part and a low graphitizability part) may be homogeneously mixed and a solid carbon product having a structure wherein both type carbons are strongly connected with each other can be obtained.

When one or both of the carbon sources is mixed in its liquid state, it is not preferred that such a liquid has large viscosity. The above liquid is preferably a liquid having a viscosity to the extent that the liquid can be stirred and mixed using a mixer such as a stirrer and a kneader. The viscosity of the liquid at a temperature under which at least one of liquid carbon sources is mixed preferably at level of 20,000 poise or less.

While several methods for producing liquid state of the carbon source may be conceivable, the most simple one is to use a carbon source which is liquid at room temperature because of low molecular weight or a carbon source which can be melted to become liquid by heating it at a temperature of not more than several hundred ° C. Another method for producing liquid state of the carbon is to dissolve the carbon source material into an appropriate solvent. When the carbon sources is mixed in the liquid state in which one or both of the carbon sources is melted by e.g. heating, or is dissolved in e.g. an organic solvent, both carbon sources can be mixed more homogeneously, compared with when the carbon sources are mixed in a solid-solid form. When both carbon sources are mixed in their liquid states, most homogeneous mixing can be attained.

Further, when at least one of the carbon sources is in a liquid state, micro void in the carbon sources is filled with such a liquid, thereby increasing bulk density of the activated carbon finally obtained through the carbonizing step and the activation step described later. The filling of the micro void with the liquid is not necessary to be carried out in the step of mixing, because similar effects can be attained if such filling is carried out at the step of curing or the step of carbonization. Thus, from this reason, at least one of the carbon sources is preferred to be in liquid state from the step of mixing to the step of carbonization.

When either of the carbon sources is not melted by heating, for example, when one of the carbon sources is a thermosetting resin, it is preferred that the other carbon source is melted by heating, or dissolved into an organic solvent. The obtained liquid may be added to the carbon source in the fine powder form, and then mixed using a mixer capable of a solid-liquid mixing, such as a paddle type stirrer, a turbine type stirrer, a ball mill, an edge runner, etc. In this case, homogeneous and precise mixing can be attained as compared with the case where both carbon sources are mixed in their powdered forms. In this occasion, when the viscosity of the mixture is high because of the insufficient the melted component, it is preferred to use a mixer capable of mixing while imparting strong shear force to the mixture, such as a kneader mixer, a internal mixer, a roll mixer, etc.

Further, in order to mix the carbon sources which are not of a high molecular material in more completely, one of the carbon sources may be added to the other carbon source in its polymerization step so that a random, a block or a graft polymerization is carried out.

(2) Next, the step of carbonization is carried out wherein the mixture of a non-graphitizable carbon source and a graphitizable carbon source obtained above is carbonized by heating.

The carbonization of the mixture in the present invention is carried out by so called a solid phase carbonization reaction. Accordingly, when the mixture is in a liquid state, it is preferably subjected to a cure treatment before the carbonization wherein the mixture is heated at the temperature of around from 150 to 350° C. in the presence or in the absence of an appropriate catalyst in an inactive atmosphere or in an oxidizing atmosphere so as to carry out a solid phase carbonizing reaction.

When the graphitizable carbon source is, for example, a pitch, it is preferred to cure a pitch component (so called anti-fusion treatment or stabilization) by gradually heating the pitch component at level of from 150 to 350° C. in an oxidizing atmosphere such as in the atmosphere, whereby dehydrogenation, dehydration, oxidation and the like will proceed to form a three-dimension crosslinked structure.

The above cure treatment by forming e.g. the crosslinked structure mentioned above may be carried out at the beginning of the carbonizing step or at a completely different step from the carbonizing step, for example, at a pretreatment step. Further, it is preferred to maintain the graphitizable carbon source such as a pitch type material in an appropriate temperature condition at the beginning of the carbonizing step, so that at least part of the graphitizable carbon source will be converted to a mesophase pitch. Consequently, the activated carbon having large capacitance and relatively high bulk density is readily obtained.

As described previously, when a phenol resin which is a thermosetting resin as the graphitizable carbon source is employed, both a resol resin and a novolac resin may be used. A resol resin may be used as it is. In the case of a novolac resin, it is preferred to add an excess of a curing agent such as formaldehyde, a resol resin or hexamethylenetetramine thereto and to heat and cure at from 150 to 350° C. for from 10 to 360 minutes.

When the mixture in a liquid state or in a thermally molten state is cured (anti-fusion treatment) in the manner described above, the mixture will usually become a massive cured product. This cured product is preferably crushed to, for example, several millimeters, before subjecting it to the carbonization, so that the resulting carbonized product is easily ground.

When the cured product is ground, the grinding machine is not particularly limited, and it is preferably the one capable of grinding the cured product to at least several ten millimeters or less, preferably several millimeters or less, particularly preferably 1 mm or less. As such a grinding machine may be preferably employed the machine which has been previously mentioned. For example, a dodge crusher, a single roll crusher, a double-roll crusher, an edge runner, a jaw crusher, a cone crusher, a hammer mill; a desk crusher, a rod mill, a ball mill, a tube mill, a roller mill, an attrition mill, a jet mill, a micron mill, a micromizer, etc may be suitably employed.

The carbonization of the mixture (or the cured product) is carried out at a level of from 300 to 2,000° C., preferably from 500 to 1,000° C., for from about 10 minutes to about 30 hours in a non-oxidizing atmosphere for example, an inactive gas such as nitrogen, argon, helium, xenon, neon, or a mixture thereof.

While an apparatus for carrying out the carbonization is not particularly limited, a fixed bed heating furnace, a fluidized bed heating furnace, a moving bed heating furnace, an internal combustion type or an outer heating type rotary kiln, an electric furnace, etc. is suitably employed.

(3) Finally, the above carbonized product is activated to an activated carbon which is a porous carbon material.

The activation is a process in which the porous structure of the solid carbonized product obtained in the step of carbonization is grown and developed to be a more fine porous structure. Basically, the activation may be carried out by both a gas activation and a chemical activation. In order to adequately pull out characteristics of the activated carbon of the present invention, a chemical activation, especially an alkali activation is preferred, in which a mixture of alkali metal compound and the carbonized product are mixed and subjected to heating and burning treatment. As the alkali metal compound, an alkali carbonate such as potassium carbonate or sodium carbonate may be used. However, it is preferred to use at least one type of an alkali metal hydroxide such as potassium hydroxide, sodium hydroxide, lithium hydroxide, rubidium hydroxide or cesium hydroxide, and particularly preferred is potassium hydroxide.

Such an alkali metal compound is added to and mixed with the carbonized product in an amount of from 0.2 to 5.0 times the mass of the carbonized product, and the mixture of the alkali metal compound and the carbonized product is heated at a temperature of the melting point of the alkali metal hydroxide or above, preferably from 300 to 1,000° C., more preferably from 400 to 900° C., for from 30 minutes to 5 hours in a non-oxidizing atmosphere. At the above temperature, the alkali metal compound erodes the carbon material strongly to emit carbon monoxide and carbon dioxide, whereby a complexly developed porous structure will be formed.

The carbonized product after the alkali activation is preferably subjected to a washing treatment, in which the carbonized product is washed off with water to rinse the alkali component, and then, neutralized for example by an acid, and again, is washed with water to rinse the acid. After the washing treatment, the carbonized product is adequately dried and sent to the next step.

A gas activation also can be employed in the activation process. In the gas activation, the carbonized product is heated at a temperature of preferably from 500 to 1,100° C., more preferably from 700 to 1,000° C., for 5 minutes to 10 hours in a weakly oxidizing gas atmosphere containing at least one of steam, carbon dioxide (combustion gas), oxygen, hydrogen chloride, chlorine, etc. thus, unorganized part of the carbonized product is contacted and reacted with the above gas, whereby such part will be decomposed and consumed to form a fine porous structure.

The activation can be carried out by a combination of an alkali activation and a gas activation.

While an apparatus for carrying out the activation is not particularly limited, an apparatus similar to the one which is used in the carbonization step can be employed. For example, a fixed heating furnace, a fluidized bed heating furnace, a moving bed heating furnace, an internal combustion type or an outer heating type rotary kiln, or an electric furnace, is suitably employed.

In the activation process, many fine pores having a diameter of at a revel of from 1 to 2 nm in the carbonized product, whereby activated carbon having a specific surface area from 500 to 2,800 $m^2/g$ is obtained.

Further, in the activation process, its conditions is preferably selected so that a mass reduction rate of the carbonized product after the activation process is from 5 to 50 mass %, preferably from 10 to 40 mass % in the alkali activation and from 30 to 90%, more preferably from 50 to 80% in the gas activation, respectively. Consequently, the specific surface area of the activated carbon obtained will be in the preferred range mentioned above.

The carbonized product after the activation step and the washing step described above is preferably ground to form a fine product having an average particle diameter of from 0.5 to 30 $\mu$m, preferably from 1 to 10 $\mu$m. A grinding machine used in this grinding process is not particularly limited, a ball mill, a vibration mill, an attrition mill, etc. is suitably employed to obtain a powder having a particle diameter mentioned above.

In the present invention, the stacking structure of the activated carbon is obtained by a reflection method using a X-ray diffraction apparatus: RU-3 type manufactured by Rigaku Denki Company Ltd.

Further, the specific surface area of the activated carbon is a value measured by Autosorb-1 manufactured by Quantachrome Corporation ltd, or an apparatus having similar functions.

That is, a specific surface area is measured by using a BET multipoint method within the range of from the relative pressure of from 0.001 to 0.05 in an adsorption-isothermal curve, which is obtained by adsorbing a nitrogen gas to a specimen at a temperature of liquid nitrogen. The specimen is dried at 200° C. for at least 12 hours under vacuum prior to the above measurement.

The pore volume is obtained from the amount of a nitrogen gas at the relative pressure of around 0.99 in an adsorption-isothermal curve mentioned above.

According to the present invention, an electric double layer capacitor comprising an electrode mainly containing the activated carbon having the above fine pore characteristic as a electrode material, can be provided. Preferably, the capacitor comprising an organic type electrolyte solution obtained by dissolving an electrolyte into an organic solvent as an electrolyte solution can be provided.

As the electrolytic solution to be used for the capacitor of the present invention, an aqueous or an organic electrolytic solution may be basically used. However, preferred is an organic electrolytic solution since the amount of energy accumulated per unit volume tends to increase. In the case of using an organic electrolytic solution, the decomposition voltage of an organic electrolytic solution is at least twice that of an aqueous electrolytic solution, and accordingly it is favorable to use an organic electrolytic solution from the viewpoint of the energy density, which is proportional to half of the product of the capacitance and the square of the voltage.

The electrode for an electric double layer capacitor of the present invention comprises, more specifically, the above carbon material and a binder, and preferably an electrical conductivity-imparting material. This electrode is formed, for example, in such a manner that a powder of the carbon material and a binder such as polytetrafluoroethylene and preferably an electrically conductive material are adequately kneaded in the presence of a solvent such as an alcohol, molded into a sheet form, followed by drying, and then bonding it to a current collector by means of e.g. an electrically conductive adhesive. Otherwise, a powder of the carbon material and a binder, and preferably, an electrically conductive material may be mixed with a solvent to obtain a slurry, which is then coated on a current collector metal foil, followed by drying to obtain an electrode incorporated with the current collector.

As the binder, for example, polytetrafluoroethylene, polyvinylidene fluoride, a fluoroolefin/vinyl ether copolymerized crosslinked polymer, carboxymethyl cellulose, polyvinyl pyrrolidone, polyvinyl alcohol or polyacrylic acid may be used. The content of the binder in the electrode is preferably from about 0.5 to about 20 mass % based on the total amount of the activated carbon and the binder. If the content of the binder is less than 0.5 mass %, the strength of the electrode tends to be insufficient, and if it exceeds 20 mass %, the electrical resistance tends to increase and the capacitance tends to decrease. The amount of the binder incorporated is more preferably from 0.5 to 10 mass %, from the viewpoint of the balance between the capacitance and the strength of the electrode. Here, as a crosslinking agent for the crosslinked polymer, an amine, a polyamine, a polyisocyanate, a bisphenol or a peroxide is preferred.

As the electrical conductivity-imparting material, a powder of carbon black, natural graphite, artificial graphite, titanium oxide or ruthenium oxide may be used. Among them, ketjen black or acetylene black as one type of carbon black is preferably used since the effect to improve electrical conductivity is significant with a small amount.

The amount of the electrical conductivity-imparting material such as carbon black in the electrode is preferably at least 5 mass %, particularly preferably at least 10 mass %, based on the total amount of the activated carbon powders and the electrical conductivity-imparting material. If the amount is too large, the proportion of the activated carbon incorporated will decrease, whereby the capacitance of the electrode will decrease. Accordingly, the incorporated amount is preferably less than 40 mass % or less, particularly preferably less than 30 mass % or less.

The solvent for forming a slurry is preferably one capable of dissolving the above binder, and e.g. N-methylpyrrolidone dimethylformamide, toluene, xylene isophorone, methyl ethyl ketone, ethyl acetate, methyl acetate, dimethyl phthalate, methanol, ethanol, isopropanol, butanol or water may optionally be selected.

A current collector for the electrode may be any electrical conductor so long as it has electrochemical and chemical corrosion resistance. For example, stainless steel, aluminum, titanium, tantalum or nickel may be used. Among them, stainless steel and aluminum are preferred from the viewpoint of both performance and price.

The current collector may be in a form of a foil, may be a foam metal of nickel or aluminum having a three-dimensional structure, or may be a net or a wool of stainless steel.

As the electrolytic solution to be used for an electric double layer capacitor of the present invention, a known aqueous or organic electrolytic solution may be used. Among them, most preferable effect can be obtained when an organic electrolytic solution is employed.

As the organic solvent, it is preferred to use at least one solvent selected from the group consisting of electrochemically stable ethylene carbonate, propylene carbonate, butylene carbonate, γ-butyrolactone, sulfolane, a sulfolane derivative, 3-methylsulfolane, 1,2-dimethoxyethane, acetonitrile, glutaronitrile, valeronitrile, dimethylformamide, dimethylsulfoxide, tetrahydrofuran, dimethoxyethane, methylformate, dimethyl carbonate, diethyl carbonate and ethyl methyl carbonate. They may be used as a mixture.

As the electrolyte for the organic electrolytic solution, preferred is a salt comprising a quaternary onium cation represented by $R^1R^2R^3R^4N^+$ or $R^1R^2R^3R^4P^+$ (wherein each of $R^1$, $R^2$, $R^3$ and $R^4$ which are independent of one another, is a $C_{1-6}$ alkyl group) and an anion selected from the group consisting of $BF_4^-$, $PF_6^-$, $ClO_4^-$, $CF_3SO_3^-$ and $(SO_2R^5)(SO_2R^6)N^-$ (wherein each of $R^5$ and $R^6$, which are independent of each other, is a $C_{1-4}$ alkyl group or alkylene group, and $R^5$ and $R^6$ may form a ring). Specific examples of the preferred electrolyte include $(C_2H_5)_4NBF_4$, $(C_2H_5)_3(CH_3)NBF_4$, $(C_2H_5)_4PBF_4$ and $(C_2H_5)_3(CH_3)PBF_4$. The concentration of such a salt in the electrolytic solution is preferably from 0.1 to 2.5 mol/l, more preferably from 0.5 to 2 mol/l.

As the separator to be interposed between the positive electrode and the negative electrode, a non-woven fabric of polypropylene fiber or glass fiber, or synthetic cellulose may, for example, be suitably used.

The electric double layer capacitor of the present invention may have any structure of a coin type wherein a pair of sheet electrodes with a separator interposed therebetween is accommodated in a metal casing together with an electrolytic solution, a wound type wherein a pair of positive and negative electrodes is wound with a separator interposed therebetween, and a laminate type wherein a plurality of sheet electrodes are laminated with a separator interposed therebetween.

Different from the conventional activated carbon in which the carbon material constituting its skeleton is only made of a high non-graphitizability carbon component, or a high graphitizability carbon component, or a simple mixture of these two kinds of components, the activated carbon of the present invention is considered to have a structure in which a high non-graphitizability carbon component and a high graphitizability carbon component are homogeneously mixed on the order of micrometer or less, and are dispersed and strongly connected with each other. Accordingly, it is estimated that the skeleton of expandable and high graphitizability carbon component will be restricted by the skeleton of the high non-graphitizability carbon component which is small in the volume change at the time of charging and discharging.

From the above reason, according to the present invention, there is provided an activated carbon for electric double layer capacitor electrode, which has good characteristics of the two type activated carbon: A high capacitance, low deterioration of the performances after a repeating charging-discharging cycle and a restricted expansion of the activated carbon particles by ion adsorption which are attained by the activated carbon derived from a high non-graphitizability carbon component, and large capacitance per unit volume caused by a high bulk density which are attained by the activated carbon derived from a high graphitizability carbon component. At the same time, in the activated carbon of the present invention, the weaknesses of the two type carbon are compensated.

Now, the present invention will be explained in further detail with reference to Examples and Comparative Examples. However, it should be understood that the present invention is by no means restricted to such specific Examples.

EXAMPLE 1

(1) 50 parts by mass of a solid resol resin having a softening point of 70° C. as a non-graphitizable carbon source and 50 parts by mass of a petroleum type pitch having a softening point of 150° C. as a graphitizable carbon source were weighted out. They were dissolved and mixed into 200 parts by mass of tetrahydrofuran (hereinafter referred to as THF) at 25° C., followed by reduced-pressure distillation using a rotary evaporator to remove THF to obtain a homogeneous mixture of the resol resin and the pitch.

Then, the mixture was put in a crucible made of alumina. The mixture was heated to 300° C. at a heating rate of 30° C./hour in the atmosphere and kept at 300° C. for 2 hours to cure the mixture.

(2) The resulting cured mixture was ground using a Jaw crusher to particle sizes of several millimeters or less, and again put in a crucible. The crucible was heated to 800° C. at a heating rate of 250° C./hour in an atmosphere of nitrogen and kept at 800° C. for 2 hours to obtain a carbonized product. The decrease in the mass during the carbonization was 40%.

(3) 200 parts by mass of potassium hydroxide (hereinafter referred to as KOH) was mixed with 100 parts by mass of the carbonized product obtained above, and then the mixture was put in a crucible made of silver, followed by heating in an atmosphere of nitrogen at a heating rate of 250° C./hour to 800° C. and kept at 800° C. for 2 hours to carry out an activation treatment. The activated product was washed adequately with de-ionized water, neutralized with 0.1 N-hydrochloric acid, and further thoroughly washed with de-ionized water. The washed activated product was dried under vacuum at 250° C. and was pulverized using a ball mill made of alumina to an average particle diameter of 5 μm.

The activated carbon thus obtained had a stacking structure having 2 layers or less in proportion of 39%, the stacking structure having 5 layers or more in a proportion of 19%, a specific surface area of 1,900 m$^2$/g, and a total pore volume of 0.9 cm$^3$/g.

(4) Then, a mixture consisting of 80 mass % of the obtained an activated carbon, 10 mass % of Furnace-Black (manufactured by KETJENBLACK International Company, trade name: KETJENBLACK EC) as an electrical conductivity-imparting material and 10 mass % of a polytetrafluoroethylene as a binder, was kneaded while adding ethanol thereto. Then, the mixture was rolled to obtain an electrode sheet having a thickness of 0.65 mm, which was dried at 200° C. for 2 hours. Then, two electrodes having a diameter of 12 mm were punched from the sheet, and these two electrodes as a positive electrode and a negative electrode, were respectively bonded to an aluminum sheet as a current collector by means of a graphite type electrically conductive adhesive. The mass and size of each above punched electrode were measured in the dried state before it is bonded to the aluminum sheet.

Then, the positive and the negative electrodes bonded to the aluminum sheet were dried under vacuum at 250° C. for 4 hours, and impregnated with a propylene carbonate solution containing $(C_2H_5)_3(CH_3)NBF_4$ at a concentration of 1 mol/l in an atmosphere of dry argon. The two electrodes were disposed so that they faced each other by means of a separator made of polypropylene non-woven fabric, and the electrodes were sandwiched between two glass sheets and constricted under a constant pressure and then fixed. Then, a coin-type capacitor cell was constructed so that the above fixed electrodes were completely immersed in a propylene carbonate solution containing $(C_2H_5)_3(CH_3)NBF_4$ at a concentration of 1 mol/l.

A voltage of 2.5 V was applied to the accomplished coin-type capacitor cell, and the capacitance and the internal resistance were measured, whereupon they were 4.5 F and 8.2 Ω/cm$^2$, respectively.

Further, the coin-type capacitor cell which had been used in the measurement was disassembled in its charged state, and each thickness of the positive and the negative electrodes was measured. Then, the expansion coefficient of the electrodes after charging was obtained by the ratio to the thickness of the electrode before the impregnation with the electrolyte. As a result, an average expansion coefficient of the positive and the negative electrodes was 15%.

EXAMPLE 2

(1) 50 parts by mass of a solid resol resin having a softening point of 70° C. as a non-graphitizable carbon source and 50 parts by mass of a petroleum type pitch having a softening point of 90° C. as a graphitizable carbon source were weighted out. They were heated to 150° C. and melt-mixed with each other, and cooled to be in a solid form. The resulting solid mixture was ground using a jaw crusher to particle sizes of several millimeters or less. Then, hexamethylenetetramine was added to the ground mixture in an amount of 10 mass % of the resol resin contained in the mixture, and then was ground and mixed using a ball mill to an average particle diameter of 70 μm. Then, the mixed powder thus obtained was heated to 200° C. at a heating rate of 200° C./hour in the atmosphere and kept at 200° C. for 2 hours to obtain a cured product.

(2) The cured product was put in a crucible made of alumina and was heated to 800° C. at a heating rate of 250° C./hour in an atmosphere of nitrogen and kept at 800° C. for 2 hours to obtain a carbonized product.

(3) Similarly to the procedure as in Example 1, the obtained carbonized product was activated using KOH, washed, dried, and pulverized to obtain activated carbon having an average particle diameter of 5 μm. This activated carbon had a stacking structure having 2 layers or less in a proportion of 52%, the stacking structure having 5 layers or more in a proportion of 14%, a specific surface area of 2,000 m$^2$/g, and a total pore volume of 1.0 cm$^3$/g.

(4) Using the activated carbon obtained above, a coin-type electric double layer capacitor was assembled in the same manner as in Example 1. A voltage of 2.5 V was applied to the capacitor, and the capacitance and the internal resistance were measured, whereupon they were 5.1 F and 7.5 Ω/cm$^2$, respectively.

Then, the coin-type capacitor cell which had been used in the measurement was disassembled in its charged state, and each thickness of the positive and the negative electrodes was measured. Then, the expansion coefficient of the electrodes after charging was obtained by the ratio to the thickness of the electrode before the impregnation with the electrolyte. As a result, an average expansion coefficient of the positive and the negative electrodes was 12%.

EXAMPLE 3

(1) 80 parts by mass of a liquid resol resin (solid parts; 50%) obtained by dissolving de-hydrated resol resin into ethylene glycol as a non-graphitizable carbon source and 20 parts by mass of a petroleum type pitch which was ground to an average particle diameter of 5 μm and had a softening point of 250° C. as a graphitizable carbon source were weighted out. They were mixed to be in a slurry state, and again mixed homogeneously using a feather shaped stirrer. The resulting mixture was heated to 150° C., melt-mixed with each other, and cooled to be in a solid form. Similarly to the procedure as in Example 1, the obtained mixture was cured, carbonized, and activated to obtain activated carbon having a specific surface area of 2,200 m$^2$/g, and a total pore volume of 1.10 cm$^3$/g. This activated carbon had a stacking structure having 2 layers or less in a proportion of 60%, a stacking structure having 5 layers or more in a proportion of 10%.

(2) Using the activated carbon obtained above, a coin-type electric double layer capacitor was assembled in the same manner as in Example 1 except that $(C_2H_5)_4NBF_4$ was used instead of $(C_2H_5)_3(CH_3)NBF_4$. A voltage of 2.5 V was applied to the capacitor, and the capacitance and the internal resistance were measured, whereupon they were 5.5 F and 7.1 Ω/cm$^2$, respectively.

Then, the coin-type capacitor cell which had been used in the measurement was disassembled in its charged state, and each thickness of the positive and the negative electrodes was measured. Then, the expansion coefficient of the electrodes after charging was obtained by the ratio to the thickness of the electrode before the impregnation with the electrolyte. As a result, an average expansion coefficient of the positive and the negative electrodes was 10%.

EXAMPLE 4

(1) 20 parts by mass of a urea resin as a non-graphitizable carbon source and 80 parts by mass of a vinyl chloride resin as a graphitizable carbon source were weighted out. They were dissolved and mixed into 200 parts by mass of THF at 25° C. with each other, followed by reduced-pressure distillation using a rotary evaporator to remove THF to obtain a homogeneous mixture of the urea resin and the vinyl chloride resin.

The resulting mixture was ground using a jaw crusher to a particle size of several millimeters or less, and was heated to 180° C. at a heating rate of 100° C./hour in an atmosphere of nitrogen and kept for 30 minutes to cure the urea resin component.

Further, the resulting product was heated to 400° C. at a heating rate of 100° C./hour to thermally decompose the vinyl chloride resin component to pitch and kept at 400° C. for 2 hours to convert the pitch component to its mesophase pitch.

(2) The resulting mixture was ground using a ball mill to an average particle diameter of 100 μm, and was subjected to non-molten treatment in a small rotary kiln at 250° C. for 3 hours in the atmosphere, and then was heated to 800° C. at a heating rate of 250° C./hour in an atmosphere of nitrogen and kept at 800° C. for 2 hours to obtain a carbonized product.

(3) Similarly to the procedure as in Example 1, the obtained mixture was activated, washed, and pulverized to obtain an activated carbon. This activated carbon had a stacking structure having 2 layers or less in a proportion of 55%, a stacking structure having 5 layers or more in a proportion of 12%, 1,700 $m^2/g$ of the specific surface area, and 0.75 $cm^3/g$ of the total pore volume.

(4) Using the activated carbon obtained above, a coin-type electric double layer capacitor was assembled in the exactly same manner as in Example 1. A voltage of 2.5 V was applied to the capacitor, and the capacitance and the internal resistance were measured, whereupon they were 4.6 F and 8.5 $\Omega/cm^2$, respectively.

Then, the coin-type capacitor cell which had been used in the measurement was disassembled in its charged state, and each thickness of the positive and the negative electrodes was measured. Then, the expansion coefficient of the electrode after charging was obtained by the ratio to the thickness of the electrode before the impregnation with the electrolyte. As a result, an average expansion coefficient of the positive and the negative electrodes was 18%.

EXAMPLE 5

(1) 1 mol of formaldehyde was mixed with 0.8 mol of a phenol resin and 0.005 mol of sodium hydroxide was added thereto as a catalyst. Then, 40 mass % of a coal tar pitch having a softening point of 110° C. was added to the mixture of formaldehyde and phenol resin, and was refluxed at 95° C. for 1.5 hour, followed by gradually reducing the pressure to about 6.7 kPa. Then the mixture was heated to the internal temperature of 120° C., and retuned to the room temperature to obtain a mixture of the liquid phenol resin and the pitch. To this mixture containing the liquid phenol resin was added hexamethylenetetramine in an amount of 10 mass %, and cured in the same condition as in Example 1.

(2) The resulting carbonized product was ground using a Joe crusher to a particle size of several millimeters or less, and was kept at 700° C. for 2 hours in a crucible made of alumina to obtain a carbonized product. The decrease in the mass during the carbonization was 45%.

(3) The resulting was treated in the same manner as in Example 1 to obtain an activated carbon. This activated carbon had a stacking structure having 2 layers or less in a proportion of 55%, a stacking structure having 5 layers or more in a proportion of 11%, a specific surface area of 2,100 $m^2/g$, and a the total pore volume of 1.05 $cm^3/g$.

(4) Using the activated carbon obtained above, electrodes sheet were prepared, and then a coin-type electric double layer capacitor was assembled, in the same manner as in Example 1.

The capacitance and the internal resistance of the accomplished coin-type electric double layer capacitor were measured in the same manner as in Example 1, whereupon they were 5.3 F and 7.3 $\Omega/cm^2$, respectively.

Then, the expansion coefficient of the electrodes was measured in the same manner as in Example 1. An average expansion coefficient of the positive and the negative electrodes was 11%.

EXAMPLE 6

A petroleum pitch having softening point of 305° C. was ground using a ball mill to an average particle diameter of 10 μm and then was heated in an oven and in the atmosphere at a heating rate of 60° C./hour to 320° C. and kept for 2 hours so as to carry out its non-molten treatment. 50 parts by mass of the powder obtained above as a graphitizable carbon source and 50 parts by mass of a solid resol resin powder having an average particle diameter of 30 μm and a softening point of 70° C. as a non-graphitizable carbon were weighted out. To this mixture was added hexamethylenetetramine in an amount of 10 mass % of the resol resin and mixed with each other homogeneously using V-type blender.

The obtained mixture powder was heated to 200° C. at a heating rate of 200° C./hour in the atmosphere and kept for 2 hours to obtain a cured product. This cured product was carbonized, activated, washed, and ground in the same manner as in Example 1 to obtain an activated carbon having a specific surface area of 1,900 $m^2/g$ and a total pore volume of 0.9 $cm^3/g$. This activated carbon had a stacking structure having 2 layers or less in a proportion of 40%, a stacking structure having 5 layers or more in a proportion of 20%.

Using the activated carbon obtained above, a coin-type electric double layer capacitor was assembled in the same manner as in Example 1. By applying a voltage of 2.5 V to the capacitor, the capacitance End the internal resistance were measured. They were 4.1 F and 8.0 $\Omega/cm^2$, respectively.

Further, the coin-type capacitor cell which had been used in the measurement was disassembled in its charged state, and each thickness of the positive and the negative electrodes was measured. Then, the expansion coefficient of the electrodes after charging was obtained by the ratio to the thickness of the electrode before the impregnation with the electrolyte. As a result, an average expansion coefficient of the positive and the negative electrodes was 18%.

COMPARATIVE EXAMPLE 1

(1) To a novolac resin powder having a melting point of 100° C. as a non-graphitizable carbon source was added hexamethylenetetramine in an amount of 10 mass % of the resin, and was adequately mixed with each other. The resulting mixture wan heated to 200° C. at a heating rate of 200° C./hour in the atmosphere and kept at 200° C. for 2 hours to obtain a cured product.

The obtained cured product was carbonized, activated, washed, and ground in the exactly same manner as in Example 1 to obtain an activated carbon. This activated carbon had a stacking structure having 2 layers or less in a proportion of 86%, but a stacking structure having 5 layers or more was not recognized. The specific surface was 2,300 m²/g and the total pore volume was 1.2 cm³/g.

(2) Using the activated carbon obtained above, a coin-type electric double layer capacitor was assembled in the same manner as in Example 1. By applying a voltage of 2.5 V to the capacitor, the capacitance and the internal resistance were measured. They were 3.00 F and 7.0 Ω/cm², respectively.

Further, the coin-type capacitor cell which had been used in the measurement was disassembled in its charged state, and each thickness of the positive and the negative electrodes was measured. Then, expansion coefficient of the electrodes after charging was obtained by the ratio to the thickness of the electrode before the impregnation with the electrolyte. As a result, an average expansion coefficient of the positive and the negative electrodes was 9%.

COMPARATIVE EXAMPLE 2

(1) A petroleum pitch having softening point of 305° C. as a graphitizable carbon source was ground using a ball mill to an average particle diameter of 200 μm and then was heated in a rotary kiln and in the atmosphere at a heating rate of 60° C./hour to 350° C. and kept for 5 minutes so as to carry out its anti-fusion treatment.

The resulting non-melted treated powder was heated to 800° C. at a heating rate of 250° C./hour in an atmosphere of nitrogen and kept for 2 hours to obtain a carbonized product.

The obtained carbonized product was activated, washed, and ground in the same manner as in Example 1 to obtain activated carbon. This activated carbon had a stacking structure having 2 layers or less in a proportion of 54% and a stacking structure having 5 layers or more in a proportion of 11%. The specific surface area was 1,650 m²/g and the total pore volume was 0.65 cm³/g.

(2) Using the activated carbon obtained above, a coin-type electric double layer capacitor was assembled in the same manner as in Example 1. By applying a voltage of 2.5 V to the capacitor, the capacitance and the internal resistance were measured. They were 4.5 F and 9.0 Ω/cm², respectively.

Further, the coin-type capacitor cell which had been used in the measurement was disassembled in its charged state, and each thickness of positive and negative electrodes was measured. Then, expansion coefficient of the electrode after charging was obtained by the ratio to the thickness of the electrode before the impregnation with the electrolyte. As a result, an average expansion coefficient of positive and negative electrodes was 32%.

The above results are summarized in Table 2 and Table 3.

TABLE 2

| | Mixing ratio of non-graphitizable carbon source/a graphitizable carbon source | Amount of the stacking structure having 2 layers or less (%) | Amount of the stacking structure having 5 layers or lees (%) |
|---|---|---|---|
| Ex. 1 | 1:1 | 39 | 19 |
| Ex. 2 | 1:1 | 52 | 14 |
| Ex. 3 | 2:1 | 60 | 10 |
| Ex. 4 | 1:1 | 55 | 12 |
| Ex. 5 | 1:1 | 55 | 11 |
| Ex. 6 | 1:1 | 40 | 20 |
| Comp. Ex. 1 | 1:0 | 86 | 0 |
| Comp. Ex. 2 | 0:1 | 21 | 22 |

TABLE 3

| | Specific surface area (m²/g) | Total pore volume (cm³/g) | Capacitance (F) | Resistance (Ω/cm²) | Electrode expansion coefficient (%) |
|---|---|---|---|---|---|
| Ex. 1 | 1,900 | 0.90 | 4.5 | 8.2 | 15 |
| Ex. 2 | 2,000 | 1.00 | 5.1 | 7.5 | 12 |
| Ex. 3 | 2,200 | 1.10 | 5.5 | 7.1 | 10 |
| Ex. 4 | 1,700 | 0.75 | 4.6 | 8.5 | 18 |
| Ex. 5 | 2,100 | 1.05 | 5.3 | 7.3 | 11 |
| Ex. 6 | 1,900 | 0.90 | 4.1 | 8.0 | 18 |
| Comp. Ex. 1 | 2,300 | 1.20 | 3.0 | 7.0 | 9 |
| Comp. Ex. 2 | 1,650 | 0.65 | 4.5 | 9.0 | 32 |

The activated carbon of the present invention has a mixed structure a high graphitizability part and a high non-graphitizability part, wherein the skeleton of a high non-graphitizability activated carbon having a high mechanical strength and an low volume change at the time of charging and discharging attains apparently high capacitance per unit volume and at the same time restricts the skeleton of a high graphitizability activated carbon having a large volume expansion at the time of charging.

Accordingly, the volume expansion of the activated carbon at the time of charging and discharging can be restricted so that an electrode material for an electric double layer capacitor and an electric double layer capacitor which have large capacitance per volume and excellent reliability for long time of period can be provided.

The entire disclosure of Japanese Patent Application No. 2000-192393 filed on Jun. 27, 2000 including specification, claims and summary are incorporated herein by reference in its entirety.

What is claimed is:

1. An activated carbon for an electric double layer capacitor electrode, which comprises:
    particles of activated carbon, wherein each particle has a skeleton constituted of a non-graphitizable carbon having a stacking structure of 2 layers or less in a proportion ranging from 25 to 80% and a graphitizable carbon having a stacking structure of 5 layers or more in a proportion ranging from 2 to 30% in the distribution of a stacking structure as obtained by analysis of the X-ray diffraction pattern of (002) plane, the particles having a specific surface area ranging from 500 to 2,800 m²/g and a total pore volume ranging from 0.5 to 1.8 cm³/g.

2. The activated carbon of claim 1, wherein said specific surface area ranges from 1,300 to 2,500 m²/g and the total pore volume ranges from 0.7 to 1.5 cm³/g.

3. An electric double layer capacitor, which comprises:
    an electrode comprising particles of an activated carbon, wherein each particle has a skeleton constituted of a non-graphitizable carbon having a stacking structure of 2 layers or less in a proportion ranging from 25 to 80% and a graphitizable carbon having a stacking structure of 5 layers or more in a proportion ranging from 2 to 30% in the distribution of a stacking structure as obtained by analysis of the X-ray diffraction pattern of (002) plane, the particles having a specific surface area ranging from 500 to 2,800 m²/g and a total pore volume ranging from 0.5 to 1.8 cm³/g.

4. The electric double layer capacitor according to claim 3, which further comprises an organic electrolytic solution obtained by dissolving an electrolyte in an organic solvent.

5. The electric double layer capacitor according to claim 4, wherein the organic solvent for the organic electrolytic solution is selected from the group consisting of ethylene carbonate, propylene carbonate, butylene carbonate, dimethyl carbonate, ethyl methyl carbonate, diethyl carbonate, acetonitrile, glutaronitrile, valeronitrile, sulfolane, a sulfolane derivative, and the electrolyte is a salt comprising a quaternary onium cation represented by $R^1R^2R^3R^4N^+$ or $R^1R^2R^3R^4P^+$, (wherein each of $R^1$, $R^2$, $R^3$ and $R^4$ which are independent of one another, is a $C_{1-6}$ alkyl group) and an anion selected from the group consisting of $BF_4^-$, $PF_6^-$, $ClO_4^-$, $CF_3SO_3^{31}$ and $(SO_2R^5)(SO_2R^6)N^-$ (wherein each of $R^5$ and $R^6$ which are independent of each other, is a $C_{1-4}$ alkyl or alkylene group, and $R^5$ and $R^6$ may form a ring).

6. The electric double layer capacitor of claim 3, wherein the activated carbon of the electric double layer capacitor has a specific surface area ranging from 1,300 to 2,500 $m^2/g$ and a total pore volume ranging from 0.7 to 1.5 $cm^3/g$.

* * * * *

UNITED STATES PATENT AND TRADEMARK OFFICE
CERTIFICATE OF CORRECTION

PATENT NO. : 6,827,879 B2
DATED : December 7, 2004
INVENTOR(S) : Shinozaki et al.

It is certified that error appears in the above-identified patent and that said Letters Patent is hereby corrected as shown below:

<u>Title page,</u>
Item [73], Assignee, should read
-- Asahi Glass Company, Limited, Tokyo (JP)
  JFE Chemiclal Corporation, Tokyo (JP) --.

Signed and Sealed this

Eighteenth Day of April, 2006

JON W. DUDAS
*Director of the United States Patent and Trademark Office*